United States Patent [19]

Harvey

[11] 4,290,519

[45] Sep. 22, 1981

[54] ARTICLE SUPPORT SYSTEM

[75] Inventor: Albert J. Harvey, Fairfield, Ohio

[73] Assignee: Diamond International Corporation, New York, N.Y.

[21] Appl. No.: 955,317

[22] Filed: Oct. 27, 1978

[51] Int. Cl.³ .............................................. B65G 47/00
[52] U.S. Cl. .................................. 198/483; 198/654; 198/694
[58] Field of Search .............. 198/655, 656, 654, 648, 198/479, 483, 461, 694; 226/173

[56] References Cited

U.S. PATENT DOCUMENTS

| Re. 26,226 | 6/1967 | Flood | 247/75.43 |
| Re. 28,350 | 3/1975 | Lerner | 53/29 |
| 1,852,627 | 4/1932 | Roberts | 198/655 |
| 2,981,432 | 4/1961 | Flood | 216/2 |
| 3,016,015 | 10/1961 | Kingston | 137/475 |
| 3,036,624 | 5/1962 | Carter | 156/566 |
| 3,064,714 | 11/1962 | Flood | 156/542 |
| 3,111,446 | 11/1963 | Flood | 156/475 |
| 3,113,904 | 12/1963 | Phipps | 156/341 |
| 3,126,309 | 3/1964 | Monas et al. | 156/566 |
| 3,139,368 | 6/1964 | Flood | 156/475 |
| 3,180,252 | 4/1965 | Fuerst | 101/40 |
| 3,193,211 | 7/1965 | Flood | 242/75.43 |
| 3,208,897 | 9/1965 | Flood | 156/475 |
| 3,231,448 | 1/1966 | Flood | 156/542 |
| 3,261,734 | 7/1966 | Long | 156/156 |
| 3,313,667 | 4/1967 | Flood | 156/230 |
| 3,434,902 | 3/1969 | Bliss | 156/230 |
| 3,540,968 | 11/1970 | White | 156/475 |
| 3,709,755 | 1/1973 | Wochner | 136/235 |
| 3,729,362 | 4/1973 | French | 136/542 |
| 3,731,715 | 5/1973 | Gageant et al. | 198/461 |
| 3,813,268 | 5/1974 | Kerwin | 156/238 |
| 3,850,774 | 11/1974 | Schonig et al. | 156/455 |
| 3,922,435 | 11/1975 | Asnes | 428/349 |
| 3,928,115 | 12/1975 | Kerwin | 156/363 |
| 4,060,446 | 11/1977 | Carter | 156/475 |

FOREIGN PATENT DOCUMENTS

| 944378 | 3/1974 | Canada | 198/483 |

Primary Examiner—Bruce H. Stoner, Jr.
Assistant Examiner—Douglas D. Watts
Attorney, Agent, or Firm—Kenyon & Kenyon

[57] ABSTRACT

A support system for articles being decorated at a decorating station is disclosed. A plurality of spaced receptacles are disposed on a horizontally moving endless conveyor which transports the receptacles and articles supported therein to the decorating station. The receptacles are contoured to the general shape of the bottom of the article to be decorated and have a recessed portion and upwardly extending edge portions. Each receptacle is formed of two sections separated along a line transverse to the path of travel of the conveyor such that the receptacle sections open and separate from one another when passing over a curved surface. In this manner, the article to be decorated may be conveyed along an adjacently disposed conveying system and directly transferred into engagement with the receptacle for conveying to the decorating station.

14 Claims, 7 Drawing Figures

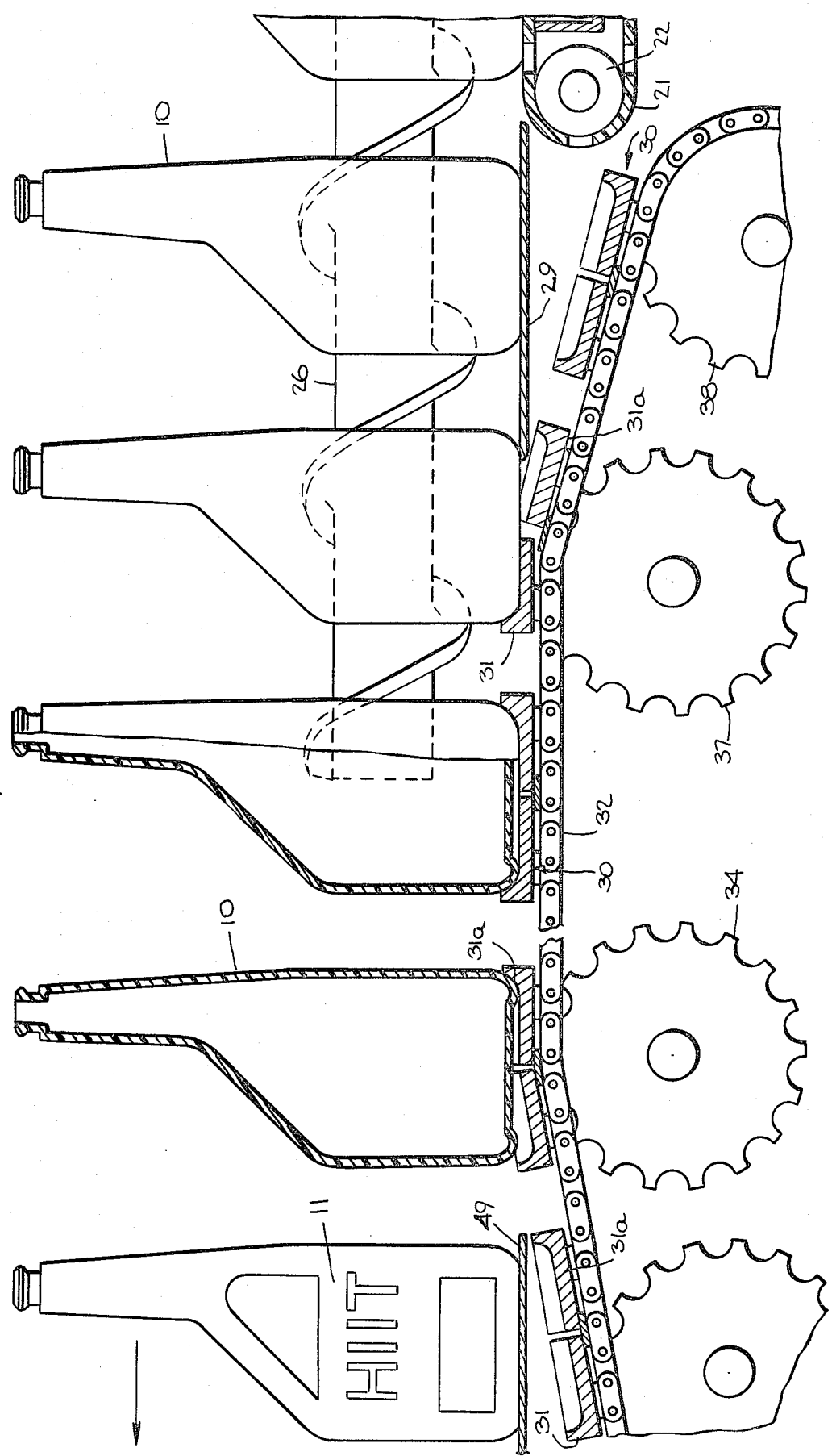

ARTICLE SUPPORT SYSTEM

BACKGROUND OF THE INVENTION

This invention relates generally to a support system for articles to be decorated and more particularly to one wherein articles to be decorated, such as containers, bottles and the like, are moved directly into engagement with an article supporting means and delivered to a decorating station.

Various types of containers, bottles and other articles are decorated or provided with other identifying indicia both prior to and after filling of the container. It is generally recognized that during the application of such indicia, the container must be supported to provide for proper registration and accurate positioning of the indicia. This is further necessary in those instances where labels are to be applied without any wrinkling or other damage to the decoration.

In numerous instances, it is desired to support the container at its base while being decorated. Superior decorating is obtained when the container is supported in a housing which supports the container about its entire lower peripheral shape. However, because of the contour characteristics of the various types of containers being decorated, feeding of the container into such a support must be from above. Sliding or direct conveying of the container into the support system is thus precluded. By the means disclosed herein a system is provided which permits the direct feeding of articles or other containers to be decorated into a support system which is adequate for supporting and restricting movement of the article while at a decorating station.

SUMMARY OF THE INVENTION

Briefly stated, the invention disclosed herein provides a support system adapted to engage and transport articles thereon to a decorating station. Included in the system is an endless conveyor which has connected thereto a drive means for driving the endless conveyor through the decorating station. A plurality of spaced receptacles are attached to the endless conveyor, the receptacles being suitable for engaging and supporting the article being decorated. Each of the receptacles has a central recessed portion and upwardly extending edge portions. The contoured shape is in general conformance with the configuration of the bottom of the article to be decorated. The receptacles are formed by sectional members which are separable along a line transverse to the path of travel of the endless conveyor. In this manner the receptacle halves open away from one another when passing over a curved surface to facilitate sliding of the article to be decorated into a holding engagement with the receptacle.

In the preferred embodiment, the endless conveyor is formed of a link chain type which is driven by sprocket members engagable therewith. The link chain is attached to each half of the receptacle by means of a flange which extends outwardly from each side of the link chain conveyor. An aperture is provided in the flange to permit a fastening means to engage and fasten the receptacle to the link chain.

A feedscrew is disposed adjacent the input end of the receptacle carrying conveyor to feed the articles to be decorated into the appropriate receptacles. The feedscrew is of a predetermined pitch which is suitable for feeding the articles in spaced relation to the spaced receptacles on the endless conveyor. As mentioned, the endless conveyor is driven by sprocket members engagable with the links. The sprocket members disposed at the end of the endless conveyor are positioned below the plane of the endless chain passing through the decorating station. Such arrangement permits the feeding of the articles to be decorated from an adjacently disposed conveyor into the receptacle support system.

In those instances where the article being decorated is difficult to remove from the receptacle means, such as may be encountered when decorating heated plastic containers, a stripping means is provided. As the receptacle leaves the decorating station and with the leading half of the receptacle dropping out of supporting engagement with the container, a tongue extending from a transfer plate engages the bottom leading edge of the container. The forward wall of the receptacle is relieved to facilitate entry of the stripping tongue thus permitting the positive disengagement of any difficult to remove containers from the receptacle subsequent to decoration.

Accordingly, it is an object of this invention to provide suitable support means for an article to be decorated at a decorating station.

It is another object of this invention to provide an article support system in which the articles are positively fed along a horizontal path through a decorating station.

It is a further object of this invention to provide an article support system adapted to receive and convey flat bottom containers through a decorating station.

These, and other objects and features of the invention will become more apparent from the following description taken in conjunction with the accompanying drawing.

BRIEF DESCRIPTION OF THE DRAWING

FIG. 6 is a fragmentary, enlarged, perspective view of an alternate embodiment of the article support system of this invention.

DESCRIPTION OF THE PREFERRED EMBODIMENT

While the article support system disclosed herein is suitable for various types of decorating systems, the preferred embodiment is described with respect to a heat transfer labeling apparatus. The heat transfer labeling apparatus is more fully described in my co-pending patent application Ser. No. 955,372 filed Oct. 27, 1978, entitled HEAT TRANSFER LABELING MACHINE, with certain aspects thereof being more fully described in my other co-pending application Ser. No.

955,370 filed Oct. 27, 1978, entitled ARTICLE INFLATING SYSTEM. Although the preferred embodiment will be described with respect to such structure it is not intended that the article support system of this invention be limited to only that particular type of an apparatus.

Figure 1:
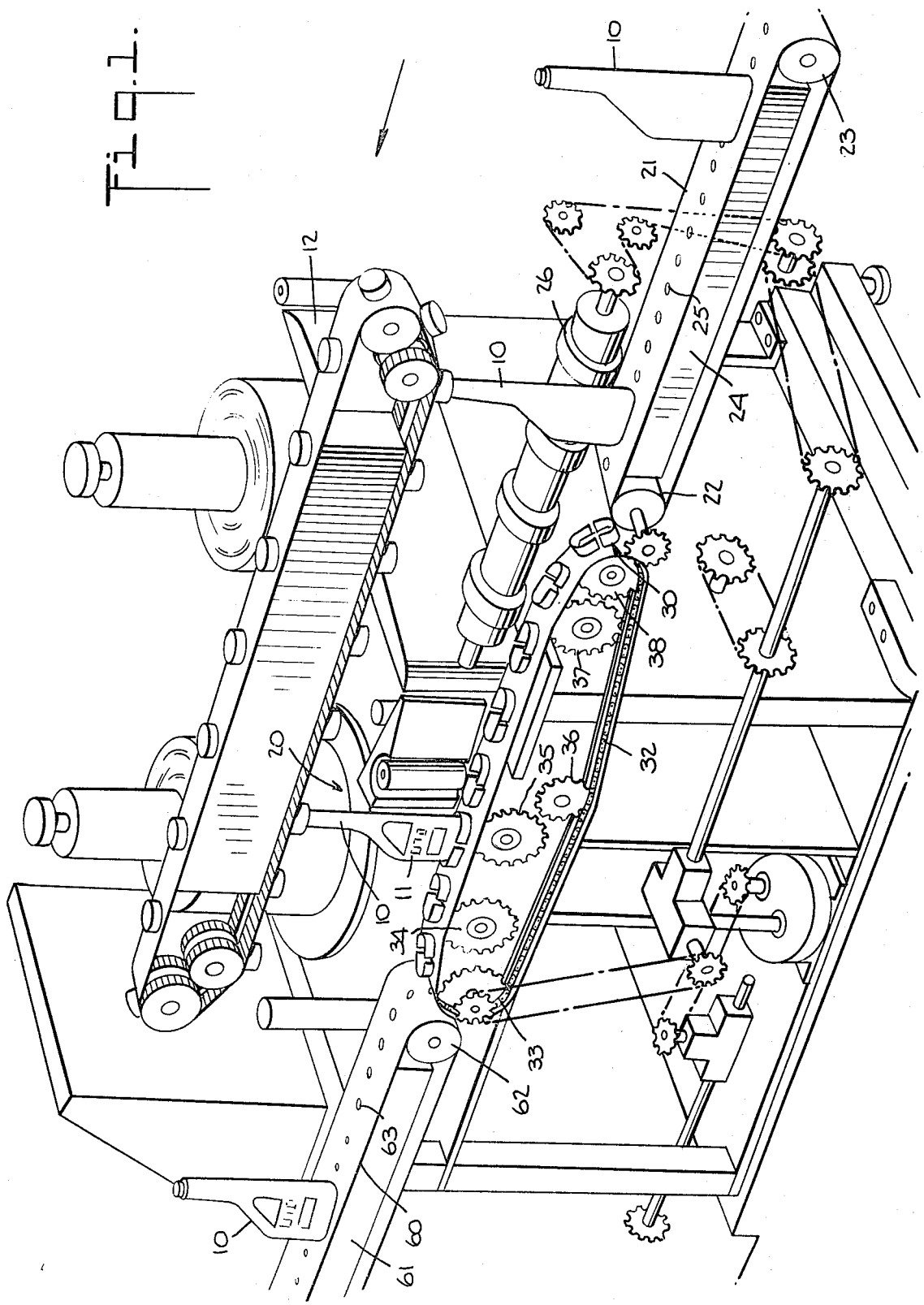
FIG. 1 is a front perspective view of a heat transfer labeling machine including the article support system of this invention.
Figure 2:
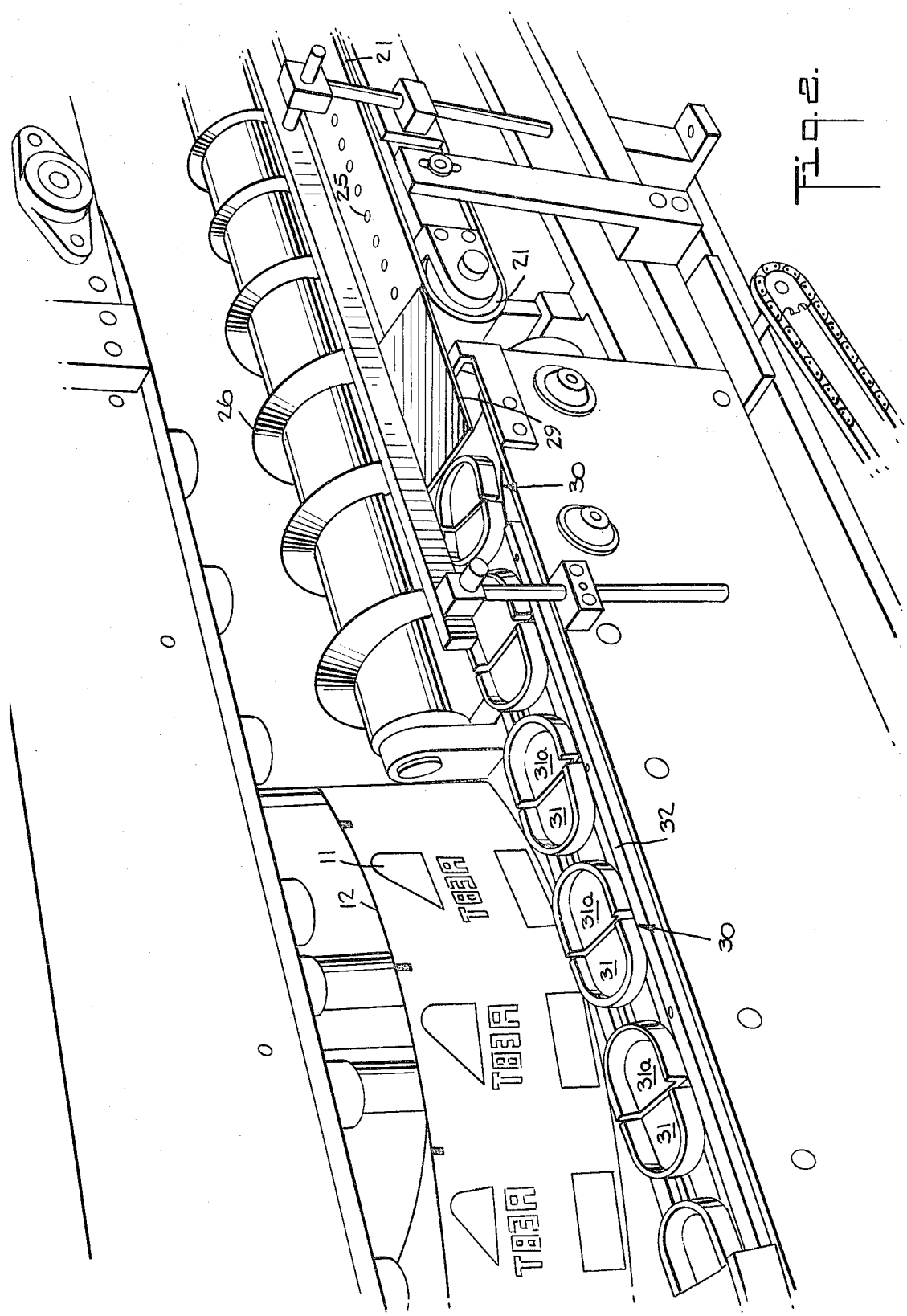
FIG. 2 is an enlarged front perspective view of the decorating station illustrating the article support system of this invention.

The article support system of this invention is described with its general application to the heat transfer labeling apparatus by reference to FIGS. 1 and 2. An irregular shaped container 10, having a substantially flat bottom is moved in the direction of the arrow (FIG. 1) to a decorating station indicated generally at 20 at which a label 11 is applied. Label 11 is carried to decorating station 20 by a web 12 which includes thereon a plurality of spaced labels 11.

Container 10 is conveyed toward the decorating station 20 by a horizontally disposed endless belt 21 which passes over drive wheels 22 and 23. Mounted within the endless belt 21 is a vacuum chamber 24 which has its upper surface in engagement with the inside portion of the belt 21. Disposed in the center of the belt 21 are a plurality of spaced apertures 25 which permit a vacuum to be applied to the bottom of the container 10 thus holding and stabilizing the container during movement. Disposed adjacent to the end portion of belt 21 is a feedscrew 26 which has a pitch suitable for engagement with the particular size container 10 being decorated. The container 10 is engaged by the threaded portion of screw 26 and fed to a receptacle holding means 30. To facilitate feeding of container 10 into receptacle holding means 30, is a horizontal plate 29 disposed at the end of belt 21 to assist in transposing the container from the conveyor belt 21 into the receptacle 30 (FIG. 2).

The container supporting receptacles 30 are each spaced from one another and fastened to an endless chain 32 as described below. Chain 32 is a link type modified for attachment to the receptacles 30 and is driven over sprockets 33, 34, 35, 36, 37 and 38. In that the container bottom is generally symmetrical, each receptacle 30 is formed of identical halves which are separable along a line transverse to the path of the endless chain 32. In those instances where the container bottom is of an irregular shape, the line of separation is preferably at the approximate center. The receptacles 30, consisting of halves 31 and 31a, are provided with contours which subtantially correspond to that of the bottom portion of the container 10 being decorated, thus providing a holding support means during the decorating step. The receptacle 30 when formed by the two halves 31 and 31a abutting against one another, includes a recessed portion which recess generally corresponds to the bottom of the container 10. In the illustrated embodiment, the recessed portion of the receptacle is substantially flat corresponding to the bottom of container 10 with the edge portions of the receptacle extending upwardly above the recessed portion so as to provide a deep dish-like shape conformed to the shape of the bottom of container 10. The upwardly extending portions of the receptacle 30 are preferably of a height sufficient to engage the side straight wall portion of container 10 in order to provide side supporting structure for the container while it is being decorated.

Figure 3:
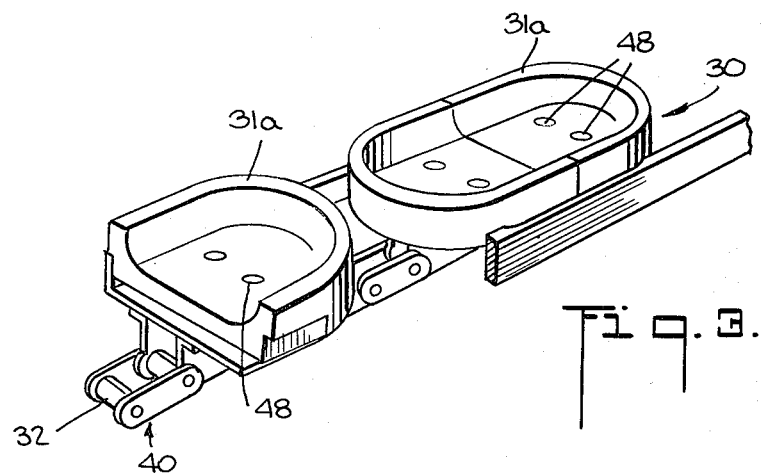
FIG. 3 is a fragmentary, enlarged, perspective view of the upper side of the receptacle holding means.
Figure 4:
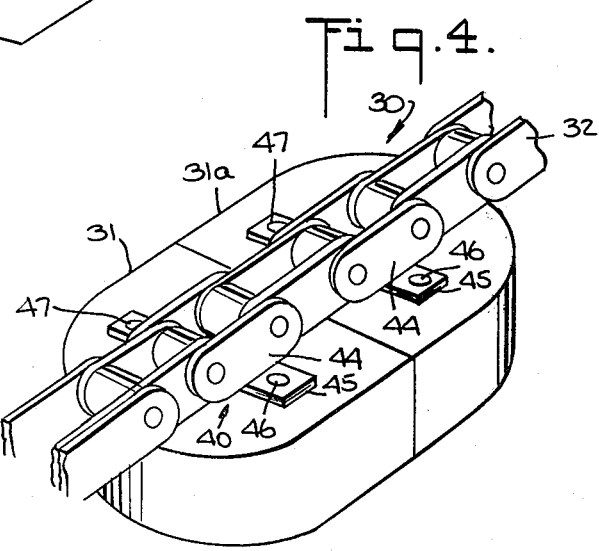
FIG. 4 is a fragmentary, enlarged, perspective view of the lower side of the receptacle holding means.

With particular reference to FIGS. 3 and 4, certain of the individual links 40 of the chain 32 are shown in an attaching relationship with the receptacle halves 31 and 31a. Links 40 which fasten to the bottom of the receptacle halves 31 and 31a are modified to include a side portion 44 which has extending therefrom a flange 45 bearing against the bottom surface of the receptacle 30. Each flange 45 is provided with an aperture 46 through which a fastening bolt 47 extends to engage the threaded portion 48 provided in each of the receptacle halves 31 and 31a. In this manner fastener 47 secures each receptacle half 31 and 31a to the endless chain 32.

Figure 5:
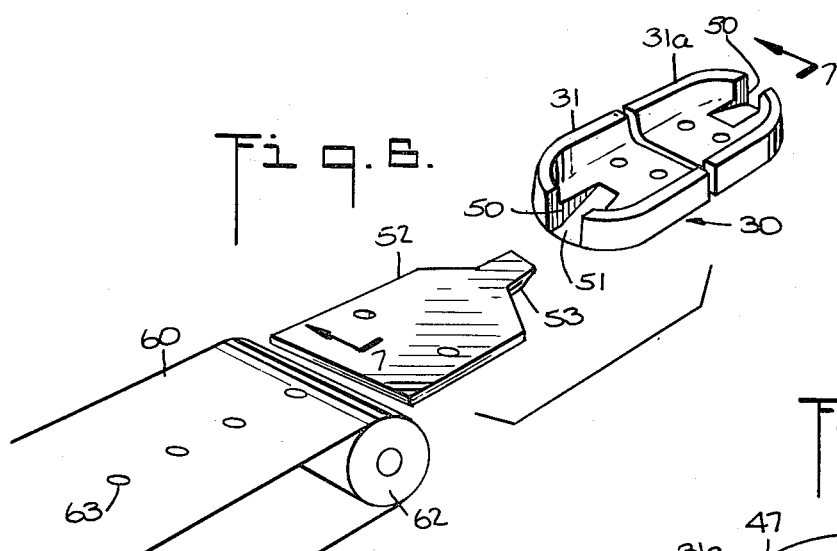
FIG. 5 is an enlarged, front elevation view illustrating containers being delivered to and leaving the decorating station.

Referring to FIG. 5, the manner in which container 10 is fed into the receptacle 30 and engaged thereby is described. Container 10 is fed by feedscrew 26 from conveyor belt 21 along the transition plate 29 and into receptacle 30 with the leading bottom edge of the container engaging the leading half 31 of receptacle 30. Feedscrew 26 feeds the forward portion of container 10 into an abutting relationship with the edge portion of the forward half 31 of receptacle 30. As the container is brought into engagement with the leading half 31 of receptacle 30, trailing half 31a is out of the path of travel of the container and on the inclined portion of endless chain 32 between sprocket members 37 and 38. As container 10 moves forward while still being engaged and fed by the feedscrew 26, chain 32 including the receptacle 30 passes over sprocket 37 with the trailing half 31a being below the plane of the bottom of container 10. As the receptacle 30 approaches the centerline of sprocket 37, trailing half 31a of the receptacle is moved upward toward the plane of the lower half of container 10 and into a holding engagement with the bottom of the container. Thus, as container 10 is conveyed to decorating station 20, it is released from feedscrew 26 with both halves of the receptacle 30 in full engagement with the lower portion of container 10. As is described in my aforementioned co-pending applications, particularly Ser. No. 955,370, entitled ARTICLE INFLATING SYSTEM, the upper open end of container 10 may be engaged in a holding relation with a suitable inflating nozzle. The container is thus securely held while being moved through the decorating station 20 at which a label 11 may be suitably applied.

Once the container leaves decorating station 20, at which label 11 was applied, it is moved onto exit conveyor 60. A vacuum chamber 61 is disposed between the upper and lower surfaces of conveyor belt 60 which is driven about wheel 62 and a similar one disposed at the other end thereof. Belt 60 contains slots 63 in the center portion thereof to permit the application of a vacuum to the lower portion of the container 10. Container 10 is discharged from the receptacle 30 as the leading portion 31 moves downward and out of engagement with container 10 after the receptacle passes over sprocket 34. While the trailing half 31a of the receptacle 30 is still in engagement with the container, the forward portion of container 10 is moved onto plate 49 which is disposed between endless chain 32 and exit conveyor 60. While on plate 49, movement of container 10 is controlled by the trailing half 31a of receptacle 30 which tends to push the container onto transfer plate 49 and then conveyor 60. As the receptacle 30 drops out of engagement with the container, it is passed over sprocket 33 and returned to the container receiving or input side of the endless chain 32.

Figure 7:
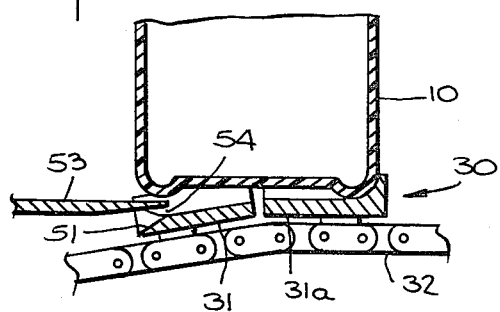
FIG. 7 is a cross-sectional view, taken along line 7—7 in FIG. 6, of an alternate embodiment of the article support system of this invention.

Positive removal of the container from receptacle 30 is provided by utilization of the embodiment illustrated in FIGS. 5 and 6. The forward wall of lead receptacle half 31 is provided with a central opening 50; the bottom surface of the opening being upwardly tapered at 51. A transfer plate 52 is interposed between exit conveyor 60 and the receptacle carrying chain 32. Protruding from transfer plate 52 is a stripping means in the form of a tongue 53 which is tapered at its forward end 54. In this manner, the upper surface of forward end 54 of tongue 53 slides into engagement with the bottom leading edge of container 10, the taper assisting in prying the container free of the receptacle when necessary (FIG. 7). Such engagement readily dislodges the container from receptacle 30 as is sometimes necessary such as in the case when dealing with a heated or otherwise softened plastic container.

Thus there has been described a support means suitable for holding and engaging an article to be decorated at a decorating station. The system herein described permits the direct feeding of articles to be decorated into support members without any intermediate movement or motion of the container. Further, the system described is highly suitable for decorating flat bottom containers which may be directly fed into the supporting means.

Although the above description is directed to the preferred embodiment of the invention, it is noted that other variations and modifications will be apparent to those skilled in the art, and may be made without departing from the spirit or scope of the present disclosure.

What is claimed is:

1. An article support system adapted to engage and transport articles to be decorated through an article decorating station which comprises:

an endless conveyor having an input end and extending through said decorating station, said input end being gradually inclined towards the portion of said conveyor means extending through said decorating station;

means for driving said endless conveyor through said decorating station;

means for feeding articles to be decorated to said input end of said endless conveyor along a path generally parallel to the path of travel of said endless conveyor through said decorating station, a plurality of spaced receptacles attached to said endless conveyor suitable for supporting the article to be decorated, each of said receptacles being contoured with a central recessed portion and upwardly extending edge portions, said contoured shape being in general conformance with the configuration of the bottom of the article to be decorated such that said receptacles are adapted to support the articles along a substantial portion of their lower peripheral shape, each of said receptacles being formed of two sections closely spaced to one another and separable along a line transverse to the path of travel of said endless conveyor so that said receptacle sections open away from one another when passing along a curved path, the inclination of said input end of said conveyor means and the separability of said two sections of said receptacles facilitating the sliding of the article to be decorated as fed by said feeding means into the path of travel of said endless conveyor and the engagement of the article to be decorated by said receptacle; and means for attaching each half of said receptacle to said conveyor.

2. A system in accordance with claim 1 wherein said endless conveyor is of a link chain type and said driving means comprise sprocket members adapted to be engaged therewith.

3. A system in accordance with claim 2 wherein said attaching means comprises a flange extending transversely from one side of said link chain conveyor to the other side thereof, and fastening means passing through an aperture in said flange member into said receptacle to facilitate fastening of each section of said receptacle to said link chain conveyor.

4. A system in accordance with claim 1 wherein said feeding means comprises a feedscrew disposed adjacent the input end of said endless conveyor, said feedscrew having a predetermined pitch suitable for feeding articles along a path parallel to the path of travel of said endless conveyor in spaced relation to said spaced receptacles on said endless conveyor.

5. A system in accordance with claim 1 which includes a pair of sprocket members disposed at said input end of said endless conveyor and another pair of sprocket members disposed at an exit end of said endless conveyor, each of said sprocket members having its axis disposed below the plane of the endless chain passing through said decorating station so that said input end and said exit end are gradually inclined towards said portion of said endless conveyor means extending through said decorating station.

6. A system in accordance with claim 1 which further includes a stripping means disposed adjacent said exit end of said endless conveyor downstream of said decorating station, said stripping means being in the form of a protruding tongue-like member engagable with the lower portion of said article in order to remove said article from said receptacle when the forward section of said receptacle is lowered out of engagement with said decorated article, said stripping means extending parallel to the path of travel of said endless conveyor.

7. A system in accordance with claim 6 wherein said receptacle includes an opening in the center portion of the forward wall thereof so as to facilitate the entry of said tongue-like member to assist in removal of said decorated article therefrom.

8. An article holding means suitable for receiving an article to be decorated, supporting the article being decorated while it is transported through an article decorating station and discharging a decorated article, said article holding means comprising a contoured receptacle having a central recessed portion and upwardly extending edge portions disposed about the perimeter thereof, said contoured shape being in a general conformance with the configuration of the bottom of the article to be decorated and slightly larger to facilitate seating of the article therein, said receptacle being adapted to support the article along a substantial portion of its lower peripheral shape, said receptacle being severed in the approximate center thereof and formed of two sections closely spaced to one another to facilitate separation from one another thereby permitting sliding of the article to be decorated into engagement with said receptacle along a path parallel to the path of travel of said receptacle through the decorating station and sliding of a decorated article out of engagement with said receptacle along a path parallel to the path of travel of said receptacle through the decorating station, said receptacle being connected to an endless conveyor having an input end and an exit end, and extending through said decorating station, said input end and said exit end being gradually inclined towards the portion of said endless conveyor extending through said decorating station, said receptacle thereby entering and leaving said path of travel along inclined paths which further facilitate sliding of the article into and off said receptacle.

9. An article holding means in accordance with claim 8 wherein the bottom of said article to be decorated is symmetrical and said receptacle sections are identical to one another and adapted to conform to the symmetrical bottom of said container.

10. An article holding means in accordance with claim 8 wherein said receptacle includes an opening in the central portion of the forward wall thereof so as to facilitate the entry of a protruding stripping member during separation of said sections of said receptacle to assist in removal of said decorated article therefrom.

11. A system in accordance with claim 4 wherein said feeding means further includes conveyor means disposed adjacent said feedscrew for feeding articles to be decorated to said endless conveyor in cooperation with said feedscrew, said conveyor means having a path of travel parallel to the path of travel of said endless conveyor.

12. A system in accordance with claim 11 and further including a stationary plate-like member interposed between said endless conveyor and said conveyor means, said plate-like member extending parallel to the paths of travel of said endless conveyor and said conveyor means and being adapted to slidably receive an article to be decorated from said conveyor means thereon for transfer to said endless conveyor by said feedscrew.

13. A system in accordance with claim 1 and further including conveyor means disposed adjacent said input end of said endless conveyor downstream of said decorating station for receiving articles from said endless conveyor, said conveyor means having a path of travel parallel to the path of travel of said endless conveyor so as to receive an article from said endless conveyor when said receptacle sections open away from each other at said input end of said endless conveyor.

14. A system in accordance with claim 13 and further including a stationary plate-like member interposed between said endless conveyor and said conveyor means, said plate-like member extending parallel to the paths of travel of said endless conveyor and said conveyor means and being adapted to receive an article from said endless conveyor when said receptacle sections open away from each other at said input end of said endless conveyor.

* * * * *